United States Patent [19]

Simmons

[11] Patent Number: 4,954,052

[45] Date of Patent: Sep. 4, 1990

[54] WAVE POWERED PUMP

[75] Inventor: Walter J. Simmons, Martinsburg, W. Va.

[73] Assignee: E. I. du Pont de Nemours and Company, Wilmington, Del.

[21] Appl. No.: 324,546

[22] Filed: Mar. 16, 1989

[51] Int. Cl.$^5$ .............................................. F04B 17/00
[52] U.S. Cl. ..................................... 417/331; 417/333
[58] Field of Search ................. 417/331, 333; 60/501, 60/504, 371, 372; 290/53

[56] References Cited

U.S. PATENT DOCUMENTS 832,482 10/1906 Hutchings ............................ 417/331
4,398,095 8/1983 Ono ........................................ 290/53

Primary Examiner—Leonard E. Smith
Assistant Examiner—Douglas J. Makosy
Attorney, Agent, or Firm—Charles E. Krukiel

[57] ABSTRACT

A land and water transportable apparatus positionable in a body of water for extracting energy from wave action in the body of water, is disclosed, comprising a wheel-shaped float positionable on the surface of the body of water operable by wave action, a wheel-shaped anchor for positioning on the bottom of the body of water for anchoring the float, a spacer disposed between the float and the anchor for securing the float to the anchor when the apparatus is transported to a deployment site, a spacer for securing the float to the anchor when the float is separated from the anchor, and an accumulator associated with the float for converting wave action energy to useful work.

14 Claims, 4 Drawing Sheets

WAVE POWERED PUMP

FIELD OF THE INVENTION

The present invention relates to devices which extract energy from wave action. Particularly, it relates to land and water transportable apparatus utilizing scrap tires for extracting energy from wave action.

BACKGROUND OF THE INVENTION

There have been many attempts to harness wave energy dating as far back as 1799. To date attempts have been unsuccessful in large measure because the investment and maintenance costs have been too high. It is exceedingly difficult to build a structure that will survive the salt water environment over a long period of time. The problem is difficult for three reasons. First, the energy in the waves can be as high as 1000 kw per meter in gales. Thus, a device designed for an average of 10 kw per meter will tear itself apart Second, if the device can survive the varying sea states, it must withstand the constant corrosive environment. Third, the device must not be adversely affected by marine growth.

A comparative survey of twelve wave energy conversion devices has been published in Hagerman and Heller, *Wave Energy: A Survey of Twelve Near-Term Technologies*. August 1988. The twelve devices have been grouped into five categories: heaving floats, heaving and pitching floats, pitching devices, oscillating water columns, and surge devices. The present invention falls under the first two categories.

Representative references showing known wave energy devices include Windle, U.S. Pat. No. 4,754,157; Liu et al., U.S. Pat. No. 4,081,962; Wood, U.S. Pat. No. 4,603,551; Hopfe, U.S. Pat. No. 4,335,576; and Menk, U.S. Pat. No. 4,185,947.

The more relevant reference is Windle which discloses a float type wave energy extraction apparatus and method. The apparatus comprises a cylinder with inlet and outlet check valves, a reciprocal piston in the cylinder, a piston rod connected to the piston and extending sealably out of the cylinder, a mechanical tensioning device connected between the piston and the cylinder for maintaining resilient tension between the piston and the cylinder, a float connected to a piston rod or the cylinder, and an anchor flexibly connected to the other of the piston rod or the cylinder which is not connected to the float. However, the present invention distinguishes over Windle, as will be described hereinafter.

SUMMARY OF THE INVENTION

It is an object of the present invention to provide an apparatus for extracting energy from wave action which can be manufactured at a reasonable cost.

It is another object of the present invention to provide an apparatus for extracting energy from wave action which can survive the rigors of ocean service for long periods of time.

It is a further object of the present invention to provide an apparatus for extracting energy from wave action which utilizes readily available materials such as damaged or worn tires from large earth-moving equipment.

It is yet another object of the present invention to provide an apparatus for extracting energy from wave action which is relatively safe to boats or ships in case of a collision.

It is a further object of the present invention to provide an apparatus for extracting energy from wave action which is relatively maintenance-free.

It is yet another object of the present invention to provide an apparatus for extracting energy from wave action which provides a piston pump with a stroke amplitude which is a fraction of the wave amplitude.

DETAILED DESCRIPTION OF THE INVENTION

Figures 1, 6:
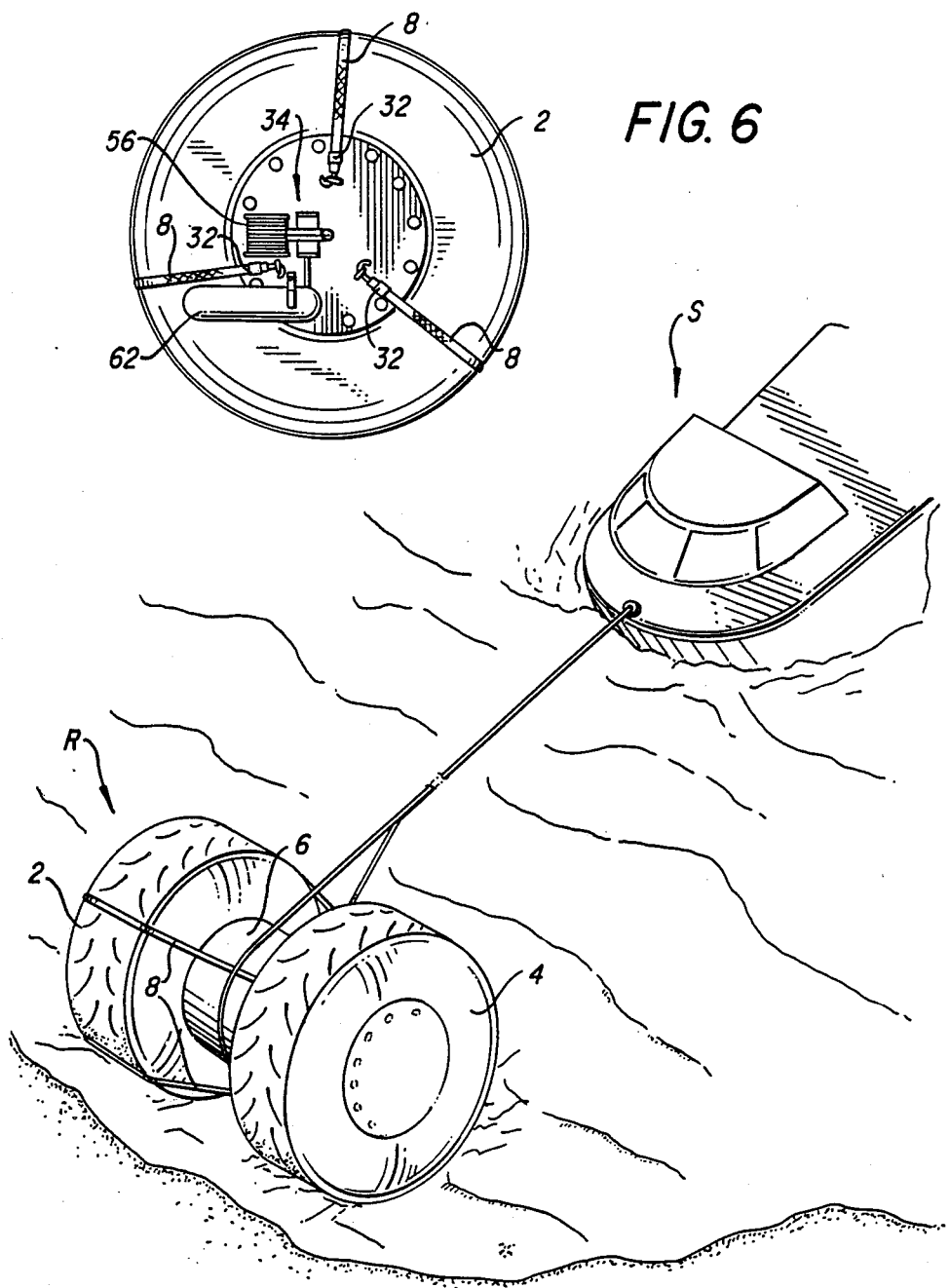
FIG. 1 is a perspective view of the apparatus of the present invention shown as it is being towed by a boat from the beach to the water for deployment.
FIG. 6 is a top plan view of the apparatus of the present invention.

Referring to FIG. 1, apparatus R comprises tires 2 and 4 secured to a spacer 6. Tire 4 is fixedly attached to spacer 6, while tire 2 is releasably secured to spacer 6 by means of three straps 8, preferably made of nylon or other similar materials. Tires 2 and 4 are preferably scrap tires obtained from large earth-moving equipment. These tires typically range in size from 8 feet to 10 feet in diameter and 18 inches to 36 inches in thickness. Preferably tires 2 and 4 are at least 6 feet in diameter and 18 inches in thickness. Tires 2 and 4 are tough and resilient, making them ideal for apparatus R. Tires 2 and 4 can survive the varying sea conditions and withstand the constant corrosive environment, and are not adversely affected by marine growth. The use of tires 2 and 4 offers ease and flexibility in handling on the beach. Because tires 2 and 4 are extremely resilient and tough, they can be dragged across the beach and handled with a forklift without being damaged. When fully assembled, apparatus R is towed to a deployment site by boat S.

Spacer 6 is a cylindrical spool disposed transversely to tires 2 and 4 and permits apparatus R to be easily rolled across the beach during handling, during which spacer 6 attains a substantially horizontal position.

Figure 2:
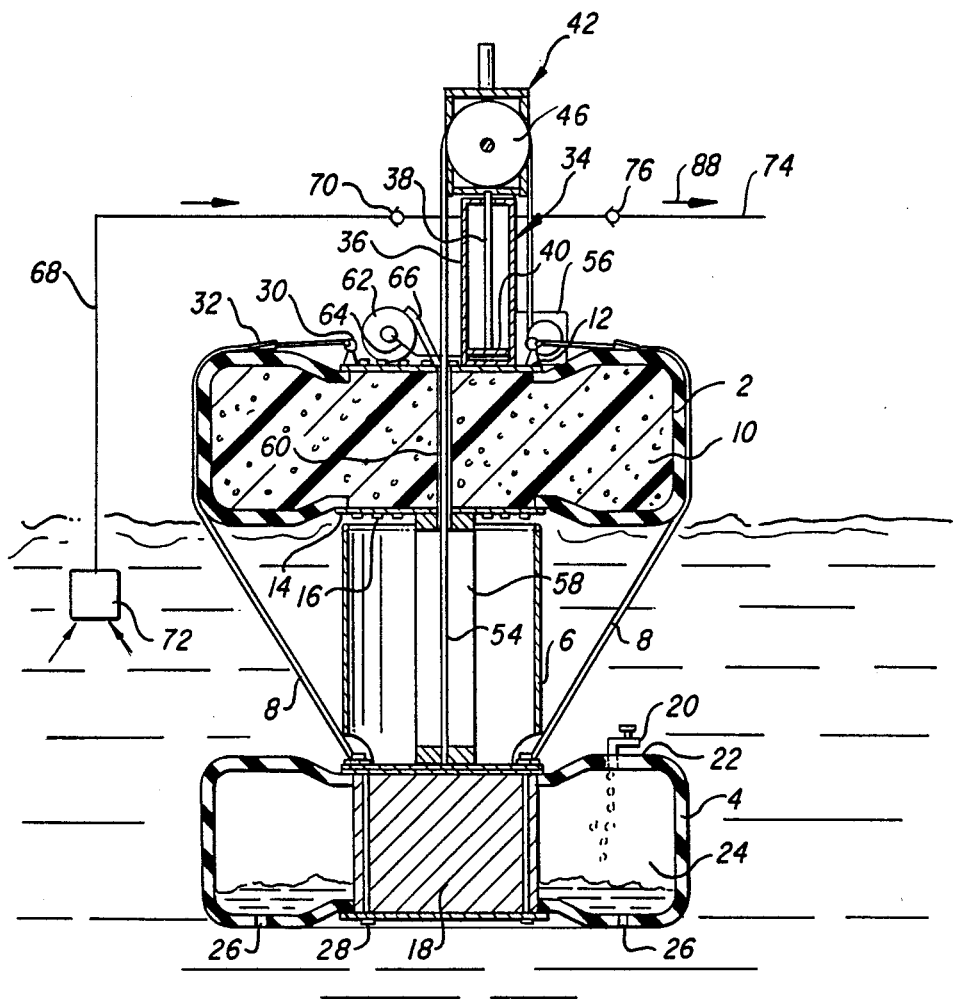
FIG. 2 is a schematic elevational view, portions of which are shown in cross-section, of the apparatus of the present invention floating in water before full deployment.

Referring to FIG. 2, tire 2 is filled with resinous foam 10 or other buoyant material to provide a buoyancy of approximately 3000 lbs/ft., thereby providing float means for apparatus R. Foam 10 is protected by approximately 3 inches of rubber and nylon cord of tire 2. Upper and lower stainless steel plates 12 and 14 are secured to the rim of tire 2 by through-bolt-and-nut assemblies 16. Since the rim is small in diameter, the amount of expensive stainless steel used is relatively small, contributing to the relatively low cost of apparatus R.

The central section 18 of tire 4 is filled with a mixture of concrete and scrap steel. Valve 20 disposed on the upper surface 22 of tire 4 permits compressed gas to fill the outer chamber 24 during transport to the deployment site and permits water to flood the outer chamber 24 when apparatus R reaches the deployment site. Holes 26 drilled in the lower surface of tire 4 allows water to enter the outer chamber 24 while air escapes through valves 20. In the apparatus described above, tire 4 has an approximate submerged weight of 6000 lbs. when completely filled with water, thereby providing anchor means for apparatus R.

During transport to the deployment site, spacer 6 is fixedly secured to tire 4 at its central section 18 by conventional means, such as bolt-and-nut assemblies 28. One end of each of straps 8 is secured to tire 4, preferably by bolts 28. The other end of each of straps 8 is secured to mounting members 30 which are rigidly attached to upper steel plate 12. Straps 8 are held taut to draw and secure tires 2 and 4 together. Conventional release means 32 in each of the straps 8, permits disengagement of tire 2 from tire 4 at the deployment site. Each of the release means 32 is conveniently located on the upper surface of tire 2. Release means 32 can be any conventional device, such as a friction buckle, seat belt buckle, or similarly functioning device.

Figure 7:
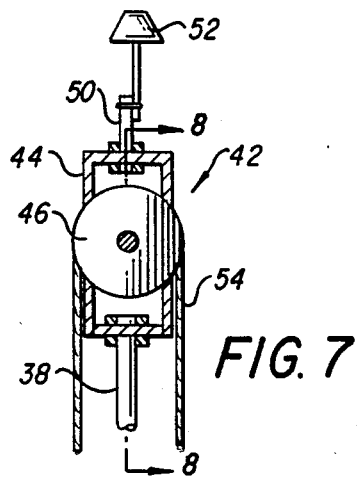
FIG. 7 is a fragmentary and partly cross-sectional view of a sheave assembly taken from FIG. 2.
Figure 8:
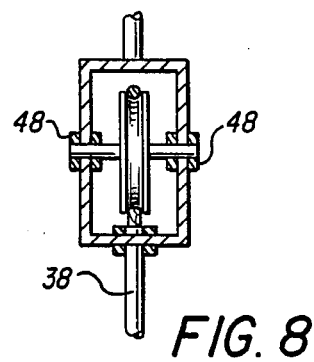
FIG. 8 is a fragmentary and partly cross-sectional view of the sheave assembly taken from FIG. 7 along line 8—8.

During towing of apparatus R to the deployment site, air is maintained in outer chamber 24 of tire 4 by connecting a source of compressed gas to valve 20. This keeps tire 4, despite its heavy weight, somewhat buoyant. While towing, spacer 6 is somewhat horizontal. At the deployment site, valve 20 is opened to permit water to enter the outer chamber 24 through holes 26. As tire 4 loses buoyancy, spacer 6 attains a vertical position A reciprocating, cylinder-piston type pump 34 is secured to upper steel plate 12 of tire 2. Pump 34 is thus above the water, making it easier to maintain and reduces the frequency of maintenance, since it is not continuously subjected to the corrosive and marine growth effects of water. Cylinder 36 is transversely mounted to upper steel plate 12 so that piston rod 38, one end of which is attached to piston 40, oscillates vertically with piston 40. A sheave assembly 42 is mounted to the free end of rod 38 and oscillates vertically with it. As best shown in FIGS. 7 and 8, the sheave assembly comprises a frame 44 rotatably supporting a sheave 46 by means of bearing assemblies 48. A short post 50 is mounted on top of frame 44 for providing a mounting means for a beacon 52 or a flag (not shown) to mark the location of apparatus R at the deployment site.

In addition to straps 8, a stainless steel cable 54 further secures tires 2 and 4 to spacer 6. One end of cable 54 is secured to the central portion 18 of tire 4, while the other end is operably associated with a winch 56 which is secured by conventional means (not shown) to upper steel plate 12 on tire 2. Cable 54 slidably fits through a cylindrical guide 58 and through a central hole 60 in tire 2. Cable 54 loops over sheave 46 which is interposed between its two ends.

At the deployment site, tire 4 is flooded with water ballast and straps 8 are released via release means 32. Winch 56 is then operated to lower tire 4 to the bottom of the body of water.

Accumulator 62 supplies compressed fluid to pump 34 by means of connection line 64 hooked up to and in fluid communication with the bottom portion of pump 34 for pushing piston 40 upwardly at the end of its downward stroke. Accumulator 62 consists of a tank capable of holding gas at a pressure sufficient to push the cylinder upward. The volume of the accumulator should be sized so that the pressure does not change substantially when the piston 40 moves from its full upward position to its full downward position. Bracket 66 or other suitable means secures accumulator 62 to upper steel plate 12 on tire 2.

Intake line 68 with check valve 70 and inlet filter 72 is secured to and in fluid communication with the upper portion of pump 34. Outlet line 74 with check valve 76 is similarly secured to and in fluid communication with the upper portion of pump 34.

Figure 3:
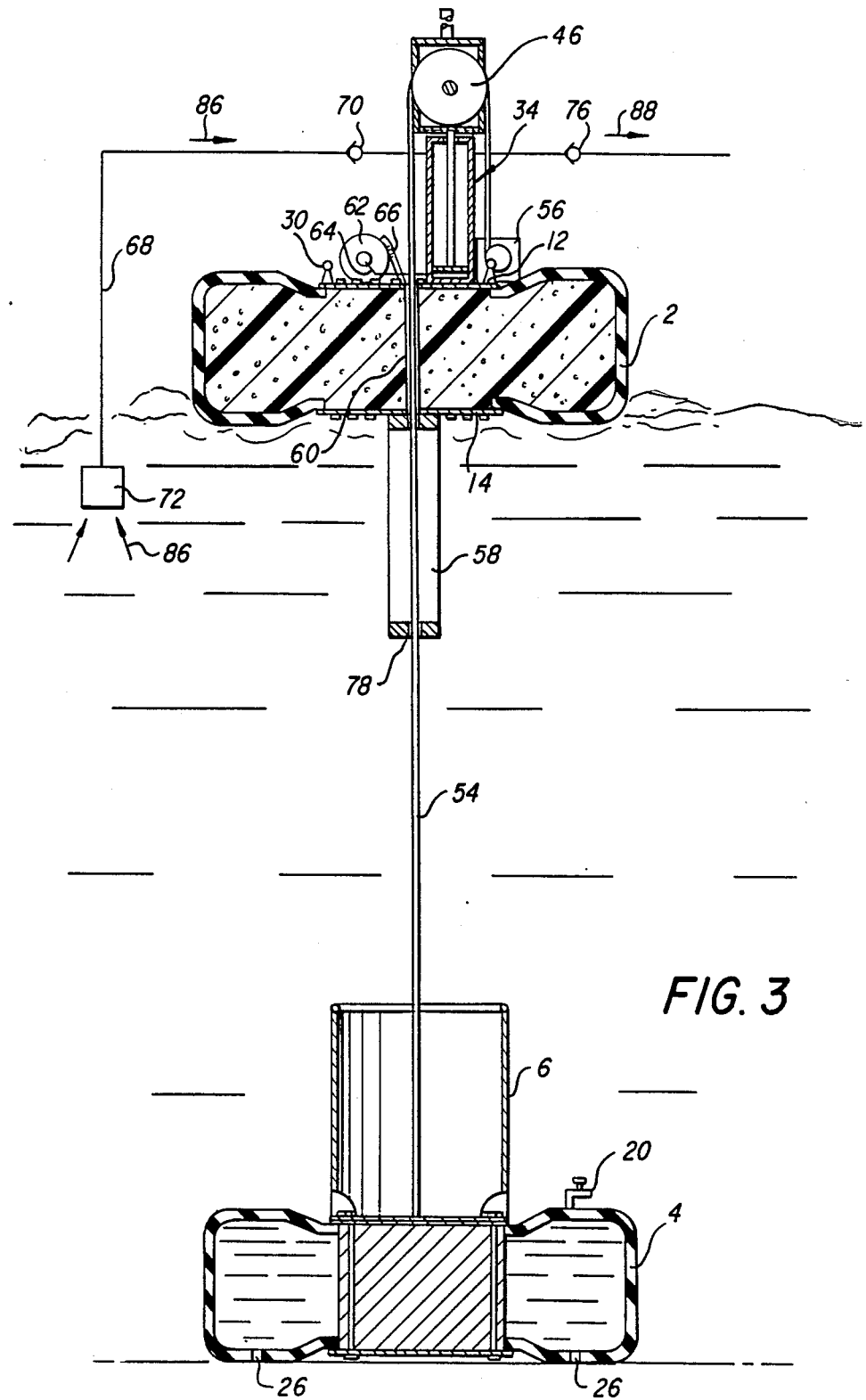
FIG. 3 is a schematic elevational view, portions of which are shown in cross-section, of the apparatus of the present invention in a fully deployed position in water.

Referring now to FIG. 3, apparatus R is shown fully deployed in the water. Tire 2 floats on the surface of the water, while tire 4 rests on the bottom and anchors tire 2 in place by means of steel cable 54. The outer chamber 24 of tire 4 is completely filled with water, providing tire 4 with a submerged weight of approximately 6000 lbs. The length of cable 54 is fixed at the winch 56; however, the length relative to the distance between tires 2 and 4 varies between a minimum and a maximum as cable 54 slides back and forth through hole 60 in tire 2. The length is minimum when tire 2 is at the trough of a wave and it is maximum when tire 2 is at the crest of the wave. Cable 54 remains taut at all times. Wave action keeps cable 54 taut as tire 2 rises to the crest of the wave, while fluid pressure from accumulator 62 keeps it taut as tire 2 falls to the bottom of the wave.

Due to the nature of wave action, tire 2 heaves up and down and pitches from side to side. The pitching motion causes a rocking motion which subjects cable 54 to high loads and could result in premature cable failure. Guide 58 advantageously minimizes the rocking motion of tire 2. Guide 58 generates horizontal forces from the pitching motion, keeping cable 54 substantially aligned therewith and substantially perpendicular to tire 2. Consequently, the pivoting motion and the resulting wear and tear at point 78 is lessened.

Guide 58 also increases the output of pump 34 by extracting energy from the pitching motion in addition to the heaving motion. Tire 2 tries to follow the contour of the surface of the wave, which results in horizontal forces that move tire 2 horizontally. This results in more relative motion between cable 54 and tire 2. Preferably, guide 58 has a length substantially equal to the diameter of tire 2.

Operation

Figure 4:
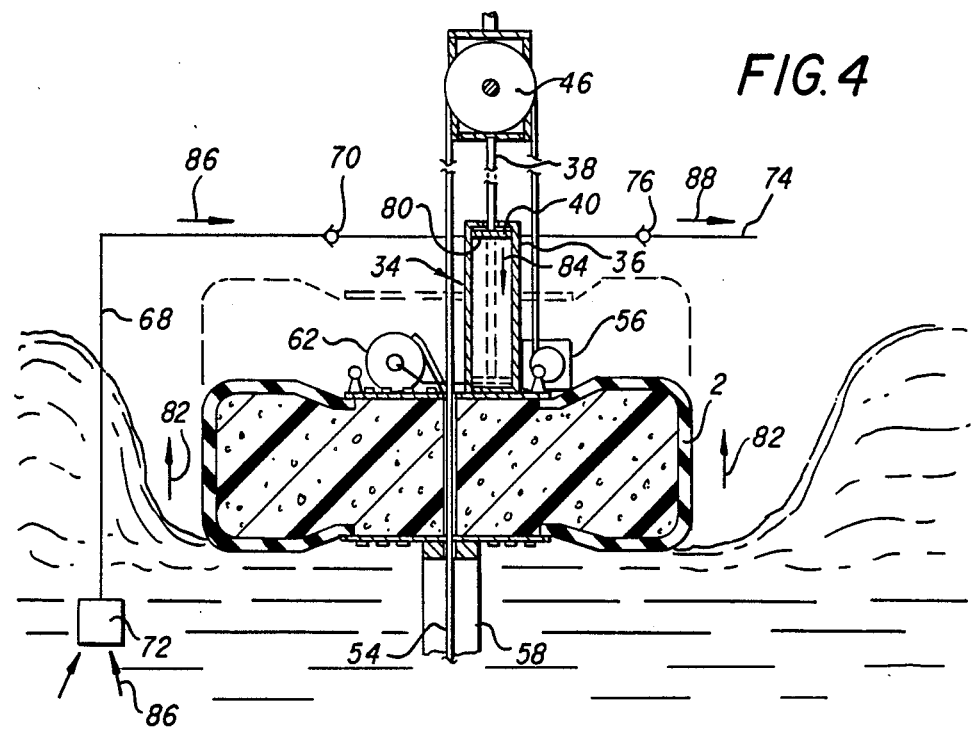
FIG. 4 is a schematic elevational and fragmentary view, portions of which are shown in cross-section, of a float means of the present invention showing the float means at the trough of a wave in an upward motion to a position generally shown in phantom lines.
Figure 5:
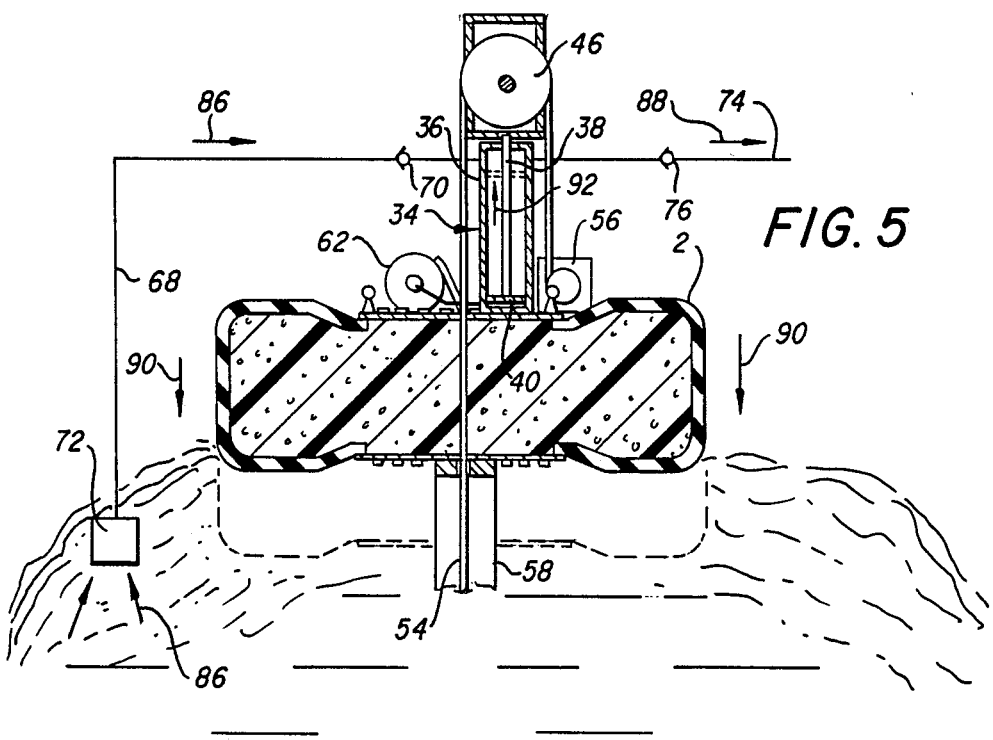
FIG. 5 is a schematic elevational and fragmentary view, portions of which are shown in cross-section, of a float means of the present invention showing the float means at the crest of a wave in a downward motion to a position generally shown in phantom lines

The operation of Apparatus R will now be described. Referring to FIGS. 4 and 5, tire 2 moves between a lower position at or near the trough of a wave, as generally shown in FIG. 4, and a higher position at or near the crest of the wave, as generally shown in FIG. 5. Similarly, piston 40 moves between an upper position generally indicated in FIG. 4, and a lower position generally indicated in FIG. 5. The lower position of tire 2 is associated with the upper position of piston 40, while the upper position of tire 2 is associated with the lower position of piston 40.

Referring to FIG. 4, cable 54 remains taut between tires 2 and 4. Fluid pressure from accumulator 62 exerts a force on the lower surface 80 of piston 40. As a wave lifts tire 2 upwardly, as generally indicated by arrows 82, from its lower position, a downward force is developed in cable 54. The downward force is transfered to piston 40 via sheave 46 and piston rod 38. As tire 2 continues to move upwardly, the downward force increases until it overcomes and exceeds the fluid pressure exerted by accumulator 62, thereby generating a net downward force. The net downward force then causes piston 40 to start to move downwardly, as generally indicated by arrows 84, from its upper position. The downward motion of piston 40 draws water into the upper portion of cylinder 36 above piston 40, through intake filter 72 and intake line 68. Check valve 70 opens up to permit water to flow in the direction indicated by arrows 86. Check valve 76 is closed to water flow opposite to the direction of flow indicated by arrow 88. As tire 2 continues to move upwardly, the net downward force is maintained and piston 40 continues to move downwardly, drawing more water into cylinder 36. As piston 40 moves downwardly, energy is also stored in accumulator 62 by increasing the fluid pressure therein.

When tire 2 reaches its upper position at or near the crest of the wave, cable 54 slackens, and the energy stored in accumulator 60 starts to push piston 40 upwardly. Referring to FIG. 5, tire 2 now moves downwardly, as indicated by arrows 90, to a lower position at or near the trough of the wave. As tire 2 continues to move downwardly, tension on cable 54 is released, allowing fluid pressure from accumulator 62 to move piston 40 upwardly, as indicated by arrow 92. As piston 40 moves upwardly, water in the cylinder 36 is pumped out through outlet line 74. Check valve 76 opens to permit water to flow out in the direction of arrow 88 while check valve 70 closes to prevent water backflow. Piston 40 continues to move upwardly until tire 2 reaches its lower position, at which point it starts to move upwardly again, putting cable 54 under increased tension and repeating the cycle again.

Piston 40 travels between its upper and lower positions a distance which is approximately one-half of the distance of travel of tire 2 between its upper and lower positions. This is very important since the total amount of movement, including wave and tide, may be in excess of 10 feet. Constructing cylinder 36 to 10 feet long is expensive both to build and maintain. By adding additional sheaves 46, the ratio of piston travel to wave movement can further be decreased to any amount.

The high pressure salt water discharged through outlet line 74 may be used for a variety of useful purposes. If the piston 40 is sized to produce water in the pressure range of 800 to 1200 psig, the salt water may be directly piped to a reverse osmosis unit, thus producing drinkable fresh water. If energy in the form of electricity is desired, the high pressure water in line 74 can drive a turbine wheel which in turn drives an electrical generator. The water discharged through line 74 can also be used to pump water to shore for use in aquariums or for mariculture. High pressure water (200 to 10,000 psig) has a variety of uses since it can be converted easily to any form of energy desired with relatively small and efficient devices. Also, the system described can be used to pump any fluid. Hydraulic oil could be substituted for the salt water by eliminating filter 72. Line 74 could then be connected to a hydraulic motor which could drive any form of equipment desired. The hydraulic fluid discharged from the motor would return to cylinder 36 in line 68.

When it is desired to relocate apparatus R to a different site, valve 20 in tire 4 is connected to source of gas pressure to purge the water out of outer chamber 24. Water is forced out through holes 26. When chamber 24 is cleared of water, winch 56 is operated to lift up tire 4 to form the pre-deployment configuration shown in FIG. 2. Straps 8 re-secure tires 2 and 4 and the apparatus is simply towed to the new site.

While this invention has been described as having a preferred design, it is understood that it is capable of further modification, uses and/or adaptations of the invention following, in general, the principle of the invention and including such departures from the present disclosure as come within known or customary practice in the art.

I claim:
1. A land and water transportable apparatus positionable in a body of water for extracting energy from wave action in said body of water, comprising:
   (a) a wheel-shaped float means positionable on the surface of said body of water operable by wave action;
   (b) a wheel-shaped anchor means for positioning on the bottom of said body of water for anchoring said float means;
   (c) a spacer being disposed between said float means and said anchor means for securing said float means to said anchor means when said apparatus is transported to a deployment site;
   (d) said spacer having release means for separating said float means from said anchor means upon positioning of said apparatus at the deployment site;
   (e) means for securing said float means to said anchor means when said float means is separated from said anchor means; and
   (f) means associated with said float means for converting wave action energy to useful work.
2. The apparatus of claim 1 wherein said float means is a tire.
3. The apparatus of claim 2 wherein said float means is filled with a buoyant material.
4. The apparatus of claim 1 wherein said anchor means is a tire.
5. The apparatus of claim 4 wherein said anchor means includes means for introducing a high density ballast material.
6. The apparatus of claim 1 wherein said spacer is fixedly secured to said anchor means.
7. The apparatus of claim 1 wherein said converting means is a pump assembly.
8. The apparatus of claim 7 wherein said pump assembly is secured to an upper surface of said float means.
9. The apparatus of claim 8 wherein said pump assembly includes stroke means for pumping water.
10. The apparatus of claim 9 wherein said converting means includes an accumulator.
11. The apparatus of claim 10 wherein said stroke means includes downstroke means for drawing water into said pump assembly and an upstroke means for forcing water out of said pump assembly.
12. The apparatus of claim 11 wherein one of said upstroke means and said downstroke means is operably associated with said securing means and the other of said upstroke means and said downstroke means is operably associated with said accumulator.

13. The apparatus of claim 12 wherein said stroke means includes an amplitude less than the amplitude of the wave action.

14. A land and water transportable platform system deployable in a body of water for use in a wave action energy extraction device comprising (a) a wheel-shaped float means positionable on the surface of said body of water operable by wave action;

(b) said float means having a surface for securing a wave action energy extraction device thereto;

(c) a wheel-shaped anchor means for positioning on the bottom of the body of water and for anchoring said float means;

(d) said anchor means having an outer chamber for filling with gas for flotation when said platform system is transported to a deployment site and for filling with ballast when said anchor means is positioned on the bottom of the body of water;

(e) a spacer being disposed between said float means and said anchor means for securing said float means to said anchor means when said apparatus is transported on land and water to the deployment site, said spacer having release means for separating said float means from said anchor means upon positioning of said platform system at the deployment site;

(f) extendable cable means having one end being secured to said anchor means and the other end being operably associated with said float means for lowering said anchor means to the bottom of the water and for securing said float means to said anchor means; and (g) guide means for keeping said cable means substantially perpendicular to said float means during movement of said float means from wave action.

* * * * *